July 19, 1938.  A. W. RODLER  2,123,915
CARTRIDGE FEEDING MECHANISM
Filed March 20, 1936  2 Sheets-Sheet 1
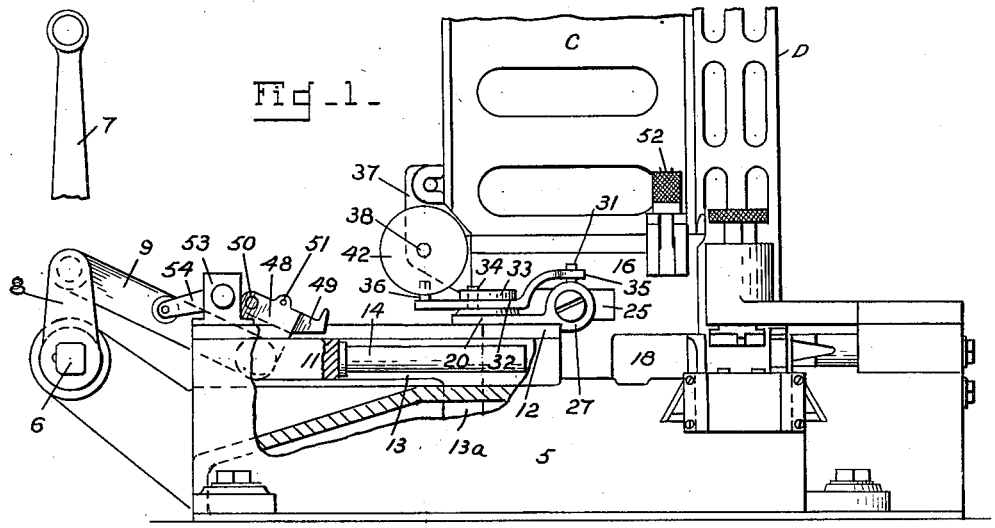
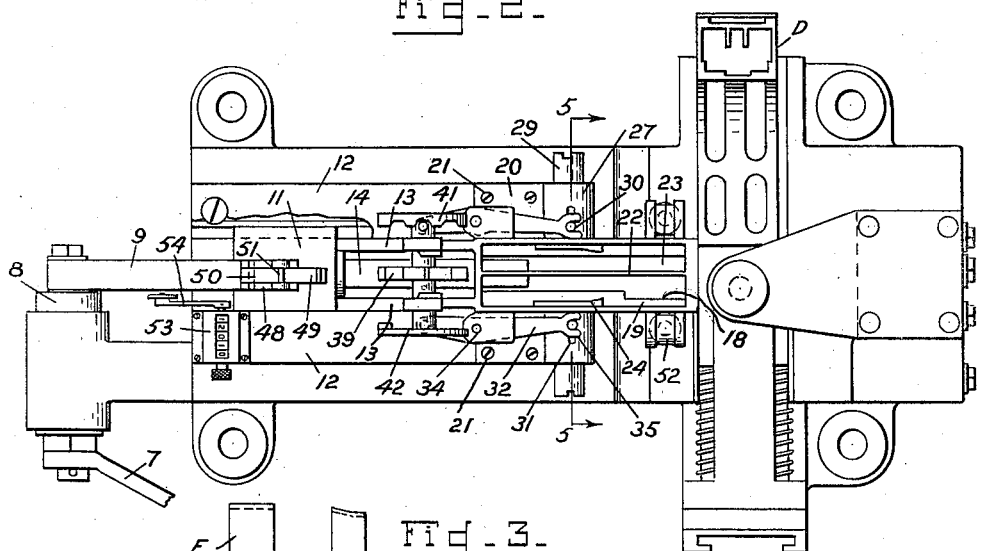
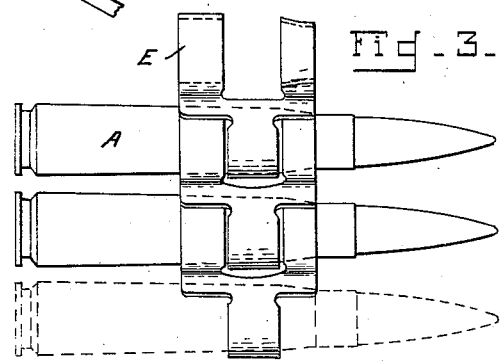
Inventor
Arthur W. Rodler
By W. N. Roach
Attorney

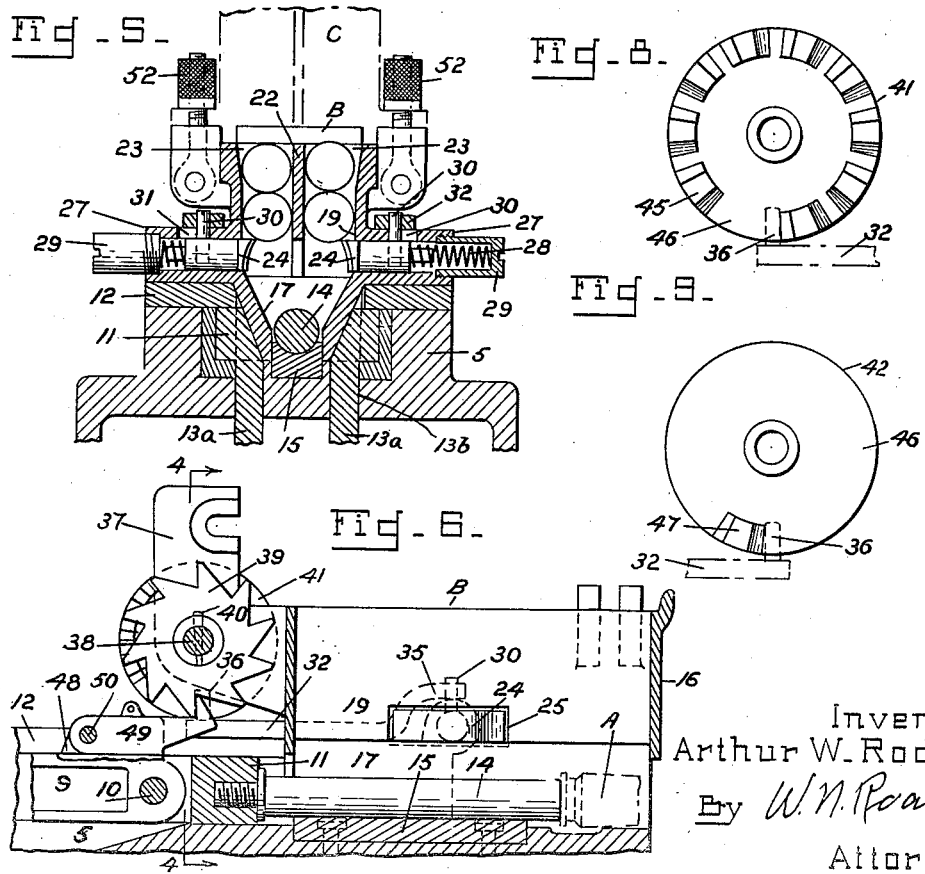

Patented July 19, 1938

2,123,915

UNITED STATES PATENT OFFICE 2,123,915

CARTRIDGE FEEDING MECHANISM

Arthur W. Rodler, Davenport, Iowa

Application March 20, 1936, Serial No. 69,840

4 Claims. (Cl. 86—48)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a cartridge feeding mechanism for loading a belt of ammunition intended to be used in a machine gun.

The purpose of the invention is to provide a simple and efficient mechanism controlled by a cartridge advancing member for selectively presenting ball and trace cartridges to the advancing member whereby they may be loaded in predetermined sequence into a belt.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a view in side elevation of a belt loading machine equipped with the improved cartridge feeding mechanism.

Fig. 2 is a plan view.

Fig. 3 is a plan view of a portion of a loaded belt.

Fig. 4 is a sectional view on the line 4—4 of Fig. 6.

Fig. 5 is a sectional view on the line 5—5 of Fig. 2.

Fig. 6 is a sectional view on the line 6—6 of Fig. 4.

Fig. 7 is a plan view of a cartridge holding pawl.

Figs. 8 and 9 are detail views of the cam wheels.

The invention is shown as applied to a belt loading machine which is disclosed in copending application, Serial No. 68,747, filed March 13, 1936 which has since matured into Patent No. 2,094,620. The machine comprises a housing 5 formed with an extension on one end for mounting a crank shaft 6 which has a handle 7 on one end and an arm 8 on the other end. A connecting rod 9 on the arm 8 is mounted on the pin 10 of a crosshead 11 which is slidably mounted between spaced guide rails 12—12 on the upper side of the housing. The crosshead 11 includes spaced arms 13—13 having depending portions 13ª disposed in slots 13ᵇ in the housing 5 and between the arms it carries a rammer 14 which rides in the trough of a guide plate 15 (Fig. 5) and is adapted to advance a cartridge A along the guide plate.

The cartridge feed box B (Figs. 5 and 6) for presenting cartridges to the plate 15 in the path of the rammer comprises an oblong casing 16 having converging plates 17 over a portion of its lower part which fit between the guide rails 12—12 and the arms 13—13 of the crosshead and straddle the rammer 14 and guide plate 15. The lower part of the casing that extends beyond the guide rails rests on the housing 5 (Fig. 1) and one of these walls is provided with a cartridge exit 18. The surfaces 19 of the lower portions of the side walls merge with the inner surfaces of the converging plates 17. The casing 16 is formed with flanges 20—20 resting on the guide rails 12—12 and secured by screws 21.

The casing is provided with a longitudinally extending partition 22 to form two chambers 23—23 for receiving different kinds of cartridges, for example one class of cartridges having regular bullets and the other class having tracer bullets. The lower edge of the partition is positioned above the upper part of the converging surfaces 17 and 19 so that sufficient space is allowed for the cartridges to fall onto the guide plate 15.

Passage of the cartridges from each of the chambers 23 to the converged exit is normally opposed by a pair of similar pawls 24—24 which are adapted to move through apertures 25—25 in the opposite side walls of the casing 16 and are positioned in line with the lower part of the partition. Each pawl has a stem 26 disposed in a laterally extending tubular housing 27 formed integrally with the casing at one end of a flange 20. A spring 28 encircling the stem is confined between the pawl and a plug 29 in the housing and normally causes the pawl to be projected into the corresponding chamber 23 where it opposes lowering movement of the stack of cartridges in said chamber. The stem of each pawl carries a pin 30 which extends through a slot 31 in the housing 27.

A pair of similar levers 32—32 are arranged parallel to and on opposite sides of the casing 16 and each lever has its central portion disposed between the flange 20 and an ear 33 and mounted on a pivot pin 34. One end of each lever has a fork 35 engaging the pin 30 of the pawl on the corresponding side of the casing, and the other end carries an upright pin 36.

The end of the casing which is closest to the crank handle is formed with a pair of spaced bracket arms 37—37 (Figs. 4 and 6) for mounting a shaft 38. A ratchet wheel 39 is mounted on the shaft between the bracket arms and is secured by a pin 40. A pair of cylindrical cam wheels 41 and 42 are mounted on the ends of the shaft and are secured thereon respectively by pins 43 and 44. The inner face of the wheel 41 is provided marginally with a plurality of spaced cam lobes 45 (Fig. 8) and with a dwell 46 produced by omitting one lobe. The inner face of the wheel 42 is provided marginally with a single cam lobe 47, (Fig. 9) and this wheel is secured on the shaft so that its single lobe corresponds angularly to the dwell 46 of the wheel 41.

The upright pin 36 of each lever 32 is normally held against the inner face of the cam wheel on the corresponding side of the feed box by virtue of the action of the spring 28 and the engagement of the fork 35 of the lever with the pin 30 on the stem of the pawl. When the cam wheels 41 and 42 are angularly displaced the cam lobes act on the upright pins 36 of the levers and the levers are accordingly rotated to retract their respective pawls from the path of movement of the cartridges in the chambers 23.

While in the present illustration the lobes on the cam wheels have a relation of one and ten it will be readily understood that this relation may be varied.

The forward end of the connecting rod 9 is provided on its upper side with a pair of spaced upright plates 48—48 between which a ratchet 49 is mounted at its rear end on a pin 50. The ratchet rests on the connecting rod and is held against upward movement by a pin 51 carried by the plates. The front end of the ratchet extends across the pin 10 of the crosshead and in spaced relation to the crosshead and it is adapted to engage a tooth of the ratchet wheel 39 when the connecting rod is at the end of its forward stroke as clearly shown in Fig. 6. Upon rotation of the connecting rod the ratchet angularly displaces the wheel 39 to partially rotate the cam wheels 41 and 42.

A twin magazine C for carrying the two different classes of cartridges is mounted on the feed box B and held in place in any suitable manner, conveniently by swing bolts 52—52.

A magazine D for carrying the links E into which the cartridges are to be loaded is carried by the housing 5. A counting device 53 carried by the housing 5 has an arm 54 that is actuated by the crank arm 8 on each revolution of the crank shaft.

At each revolution of the crank shaft the rammer moves a cartridge out of the feed box and the cam wheels 41 and 42 are intermittently displaced to actuate one or the other of the levers 32 and pawls 24 according to the sequence determined by the arrangement of the cam lobes 45 and 47.

I claim:

1. In a cartridge feeding mechanism, a feed box including a casing having a partition to provide two cartridge chambers, pawls in opposite sides of the casing, means for normally holding each pawl in position to oppose movement of a cartridge through a corresponding chamber, a lever engaging each pawl, a shaft mounted on the casing, a ratchet wheel fixed on the shaft, a pair of cam wheels fixed on the shaft and having cam lobes arranged in related sequence, each cam wheel engaged by a lever, a member for advancing a cartridge emerging from the feed box, and means controlled by said member for actuating the ratchet wheel.

2. In a cartridge feeding mechanism, a feed box having a partition to provide two cartridge chambers, a cartridge holding pawl in each chamber, a lever engaging each pawl to retract it from the chamber and release a cartridge, a shaft mounted on the casing, a pair of cam wheels fixed on the shaft and having cam lobes arranged in related sequence, each cam wheel actuating a lever, a member for advancing a cartridge released by a pawl, and means controlled by said member for actuating the shaft.

3. In a cartridge feeding mechanism, a feed box having a pair of chambers, a cartridge holding pawl in each chamber, a lever engaging each pawl to retract it from the chamber and release a cartridge, a member for advancing a cartridge released by a pawl, and means controlled by said cartridge advancing member for selectively actuating the levers in a predetermined sequence to release the cartridges in alternative series.

4. In a cartridge feeding mechanism, a stationary feed box having a pair of chambers, separate means extending into each chamber for releasably holding cartridges in said chambers, a member for advancing the released cartridges singly from the feed box, and means controlled by said cartridge-advancing member and controlling a predetermined sequence of release of the holding means to release the cartridges in alternative series.

ARTHUR W. RODLER.